United States Patent
Agarwal et al.

(10) Patent No.: US 11,422,993 B2
(45) Date of Patent: Aug. 23, 2022

(54) DUPLICATE TABLE IDENTIFICATION IN ENTERPRISE DATABASE SYSTEMS FOR DATA STORAGE OPTIMIZATION

(71) Applicant: PayPal, Inc., San Jose, CA (US)

(72) Inventors: Anchika Agarwal, Singapore (SG); Pushpinder Singh, Chennai (IN)

(73) Assignee: PAYPAL, INC., San Jose, CA (US)

(*) Notice: Subject to any disclaimer, the term of this patent is extended or adjusted under 35 U.S.C. 154(b) by 49 days.

(21) Appl. No.: 16/912,012

(22) Filed: Jun. 25, 2020

(65) Prior Publication Data

US 2021/0342319 A1 Nov. 4, 2021

(30) Foreign Application Priority Data

May 2, 2020 (IN) .............................. 202041018824

(51) Int. Cl.
*G06F 16/215* (2019.01)
*G06F 16/28* (2019.01)
*G06F 16/22* (2019.01)

(52) U.S. Cl.
CPC ........ *G06F 16/215* (2019.01); *G06F 16/2282* (2019.01); *G06F 16/285* (2019.01)

(58) Field of Classification Search
USPC ........................................................ 707/692
See application file for complete search history.

(56) References Cited

U.S. PATENT DOCUMENTS

| 2013/0238621 A1* | 9/2013 | Ganjam | G06F 16/2465 707/737 |
| 2016/0234555 A1* | 8/2016 | Kaya | H04N 21/252 |
| 2018/0173755 A1* | 6/2018 | Xia | G06F 16/24537 |
| 2019/0361971 A1* | 11/2019 | Zenger | G06F 16/288 |

* cited by examiner

*Primary Examiner* — Cam Linh T Nguyen
(74) *Attorney, Agent, or Firm* — Haynes and Boone, LLP (57) ABSTRACT

There are provided systems and methods for duplicate table identification in enterprise database systems for data storage optimization. A service provider, such as an electronic transaction processor for digital transactions, may determine data duplication in database tables so that database storage resources may be optimized. In order to determine data duplication, within database tables, a data collector daemon operation and/or application may collect metadata for tables within a domain. Using the metadata, a master table and derived tables may be determined for a group of the tables. Further, a duplication factor may be determined based on matching columns in the tables, a usage factor may be determined using processing hits to the tables, and a size factor may be determine based on table size. This allows for determination of a relevance score of the group, which provides a measure of duplication of data within those tables.

20 Claims, 5 Drawing Sheets

DUPLICATE TABLE IDENTIFICATION IN ENTERPRISE DATABASE SYSTEMS FOR DATA STORAGE OPTIMIZATION

CROSS REFERENCE

This application claims priority to Indian Provisional Application No. 202041018824, filed May 2, 2020, which is hereby incorporated by reference in its entirety.

TECHNICAL FIELD

The present application generally relates to detecting and removing data duplication within databases to optimize database resources and more particularly to a data duplication system that detects data duplication in database tables based on a relevance score of tables that are similar within a database.

BACKGROUND

Service providers may have large enterprise database systems, where data is stored and accessed across a range of different domains and databases. For example, an enterprise system may have multiple different divisions and corresponding systems for data processing, storage, and use. However, when multiple different users and operations are creating and accessing data from different sources, those operations may utilize the same data, such as a user's account information or transaction processing history for an online electronic transaction processor. When the different domains, users, and/or systems do not interact or rarely interact, the shared data may be stored multiple times by these entities, which causes data duplication. This can cost the service provider valuable computing and database storage resources. Further, the data may not be maintained in a shared manner so that it remains consistent and updated between different users. Thus, the service provider's computing systems may be inefficient and face errors in processing.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for duplicate table identification in enterprise database systems for data storage optimization. Systems suitable for practicing methods of the present disclosure are also provided.

In large enterprise data systems, as the amount of data increases, data duplication also increases. Data duplication may occur where the same or very similar data is entered to another database table, such as by a separate user, administrator, branch or division within a company or business, or other entity. In some embodiments, automatic duplication may occur where one or more operations of the enterprise data system copies tables and/or utilizes tables with other operations that generates additional data and tables. As more and more data is generated, served, and utilized every day and data becomes increasingly inexpensive to store, data duplications increases further, which leads to waste of database storage resources, increasing processes and load times, and/or further costs to maintain database systems. Data duplication in database tables may be detected by comparing database tables and determining similar columns, rows, or other table presentations, as well as and data entries. However, as tables become more numerous and have larger amounts of data, an automated system may be required to increase efficiency in identifying duplicate tables. In this regard, a master table may be identified for a group or cluster of tables, such as tables within a particular database or associated with a domain or division of an organization. Using the master table, other tables may be derived and a relevance score for the group of tables may be determined using metadata for the tables, including column names, sizes, file sizes, usages or hits on the tables, and the like. Thereafter, the relevance score may be used to determine an amount or indication of the duplication of columns and data within the tables.

For example, a service provider, which may provide services to users including electronic transaction processing such as online transaction processors (e.g., PayPal®), may allow merchants, users, and other entities to process transactions, provide payments, and/or transfer funds between these users. The user may also interact with the service provider to establish an account and provide other information for the user. In further embodiments, other service providers may also provide computing services, including social networking, microblogging, media sharing, messaging, business and consumer platforms, etc. In various embodiments, in order to utilize the computing services of a service provider, an account with the service provider may be established by providing account details, such as a login, password (or other authentication credential, such as a biometric fingerprint, retinal scan, etc.), identification information to establish the account (e.g., personal information for a user, business or merchant information for an entity, or other types of identification information including a name, address, and/or other information), and/or financial information. All of these interactions may generate data, which may be stored and managed within databases and in tables of different databases by a database management system (DBMS), for example, by different users, operations, administrators, batch processors, and the like of the service provider.

Thus, service provider's may include database tables stored and managed by the database systems of the service provider. The service provider may determine table duplication within a domain of database tables using a data collector daemon application or operation. This daemon may collect metadata for the tables in a database. The metadata may include data column names, data column lengths, column sizes, table usage rates, table hit rates, table sizes, or table creation timestamps. In other embodiments, other tables representations may also be used, such as rows of tables, row names, and the like. This may be determined across all or a subset of the identified tables to which data duplication is to be determined. Once the metadata is determined, a master table is determined for the selected tables. The master table is determined by finding matching columns between each table of the tables within the group. For example, a similarity score or metric may be calculated, such as a Jaccard similarity, between two tables in the group. Jaccard similarity may be calculated as the size of the intersection of the columns within the two tables divided by the size of the union of the columns within the two tables (e.g., $J(X,Y)=|X \cap Y|/|X \cup Y|$). However, other similarity score algorithms and/or calculations may be used. This may be done for each table to determine similarities for each table to each other table. In this regard, for a set of five tables A, B, C, D, and E, table A would have four similarities calculated for A to B, A to C, A to D, and A to E. The same is done with each of B to A, B to C, B to D, and B to E, as well as each of C, D, and E to the other tables in the group.

Thereafter, a master table may be identified using one or more of a table having a maximum sum of similarity to the other tables, a table with an oldest creation time stamp, and/or a table with a maximum number of columns. Thereafter, the master table is grouped or clustered with one or more derived tables by identifying other ones of the tables selected from the database that have a similarity metric to the master table over a specific threshold (e.g., a 65% similarity score, which may be adjusted by an administrator and/or derived based on past results). This may correspond to an iterative process where after a first master table is determined and grouped with derived tables having a similarity metric over a threshold, a second master table and second group of derived tables may further be determined as discussed above.

After determining the group or cluster of tables having the master table and the derived table(s) from the selected tables of the database(s), the data duplication system may then determine a duplication factor for the group of tables. The duplication factor may be determined by first determining a uniqueness factor for each table and a uniqueness factor for the group of tables. When determining a uniqueness factor for a table in a group, the data duplication system may perform a calculation based on the similarity of the derived table to the master table. For example, a uniqueness factor of a specific derived table may be one minus the Jaccard similarity, and therefore be a range of values from zero to one (e.g., as Jaccard similarity falls between zero, such as no similarity between table column names or other data set, to one, having full similarity). However, if the table is the master table, then the data duplication system may consider the score to be 1. Once the uniqueness factors of the individual tables are determined, the uniqueness factor for the group of tables may be determined as an average of all the uniqueness factors for the all of the tables in the group, including the master table. In some embodiments, the group uniqueness factor for the group of tables may also be weighted, such as when a specific table may be weighted higher. Thereafter, the duplication factor for the group of tables having the master table and the derived table(s) may be calculated, such as by one minus the uniqueness factor of the group of tables.

Further, the data duplication system may also determine a usage factor and a size factor for the group of tables having the master table and the derived table(s). The usage factor may be based on computing hits to the tables within the group, such as accessing, adding data to or deleting data from, sending or receiving, linking to, or otherwise manipulating or using the tables within the group. Hits may also be associated with particular types of entities performing the hits or operations with respect to the tables. For example, hits may be associated with individual end user operations and/or batch processing operations that utilize the tables within the group. Thus, the data duplication system may determine a number of users hits on a table in the group and divide that by a maximum number of user hits on a table within the same group, which may determine relative user usage. Similarly, for batch processing hits, batch hits on a table in a group is divided by a maximum number of batch hits on a table in the same group to determine relative batch usage. Hits may be defined herein as processing operations that may be performed on or with tables, such as accessing tables, updating, changing, or creating tables, columns, or data entries, or otherwise performing a computing task with the tables. Thereafter, the group user usage for a group may be determined based on a sum of the relative usage usages for each table in the group divided by a total number of tables in the group. This process is likewise utilized for group batch usage where a sum of the relative batch usages for each table in the group is divided by a total number of tables in the group. Lastly, to determine a group usage factor for the group, a weighted average of the group batch usage and group user usage is determined. This may be done by weighing the group batch usage and the group user usage and dividing by the weights applied to the group batch usage and group user usage.

Lastly, to determine the relevance score, a size factor for the group including the master table and the derived table(s) is determined. This may be determined based on a size of a table in storage space (e.g., database file size) of the tables within the group, such as in kilobytes (KBs), megabytes (MBs), gigabytes (GBs), etc. A relative size of a table in a group may be determined based on a size of a derived table in a group divided by a maximum size of a table in the group, which may include subtracting this amount from one. This may be applied to all derived tables and the relative size may be set at 1 for the master table. Further, a group size factor may then be determined. For example, the group size factor may be determined based on a sum of all the relative sizes of all the tables in the group divided by a total number of tables in the group. This may also be determined as a weighted average, such as where a master table or other derived table in the group may be assigned a higher or lower weight or value than one or more other tables in the group.

Using these three factors, the data duplication system of the service provider may then determine a relevance score for the group of tables including the master table and the derived table(s). The relevance score may correspond to a weighted average of the duplication factor, the usage factor, and the size factor, such as by adding each together and dividing by three. In some embodiments, different factors may be weighted differently. For example, the duplication factor may be weighted higher as it may be of higher importance to detecting data duplication. However, other weights may be adjusted by the user or administrator reviewing the database tables as necessary to detect data duplication. In this regard, a high relevance score may correspond to a clean database system that includes little to no data duplication. However, database systems having a high amount of data duplication may have low relevance scores, thereby indicating the database system and/or domain of table has a high amount of data duplication.

Thereafter, the data duplication system may output the results to one or more users or administrators, and/or may store the results in a database. In this regard, the data duplication system may include a user interface to show one or more output graphs for the master and derived tables, as well as the factors and scores determined above. A user may be capable of uploading a new file and table and checking against existing tables to determine if the table is a duplicate. Further, the data duplication system may link to the master table if one or more of the derived tables are accessed, including providing the relevance score for the group of tables. Thus, other tables may be provided to check against data duplication when a new table and/or column within a table is created, the system may link to one or more of the tables, including the master table, within the group to prevent further data duplication and provide faster database table access and computing use.

Figure 1:
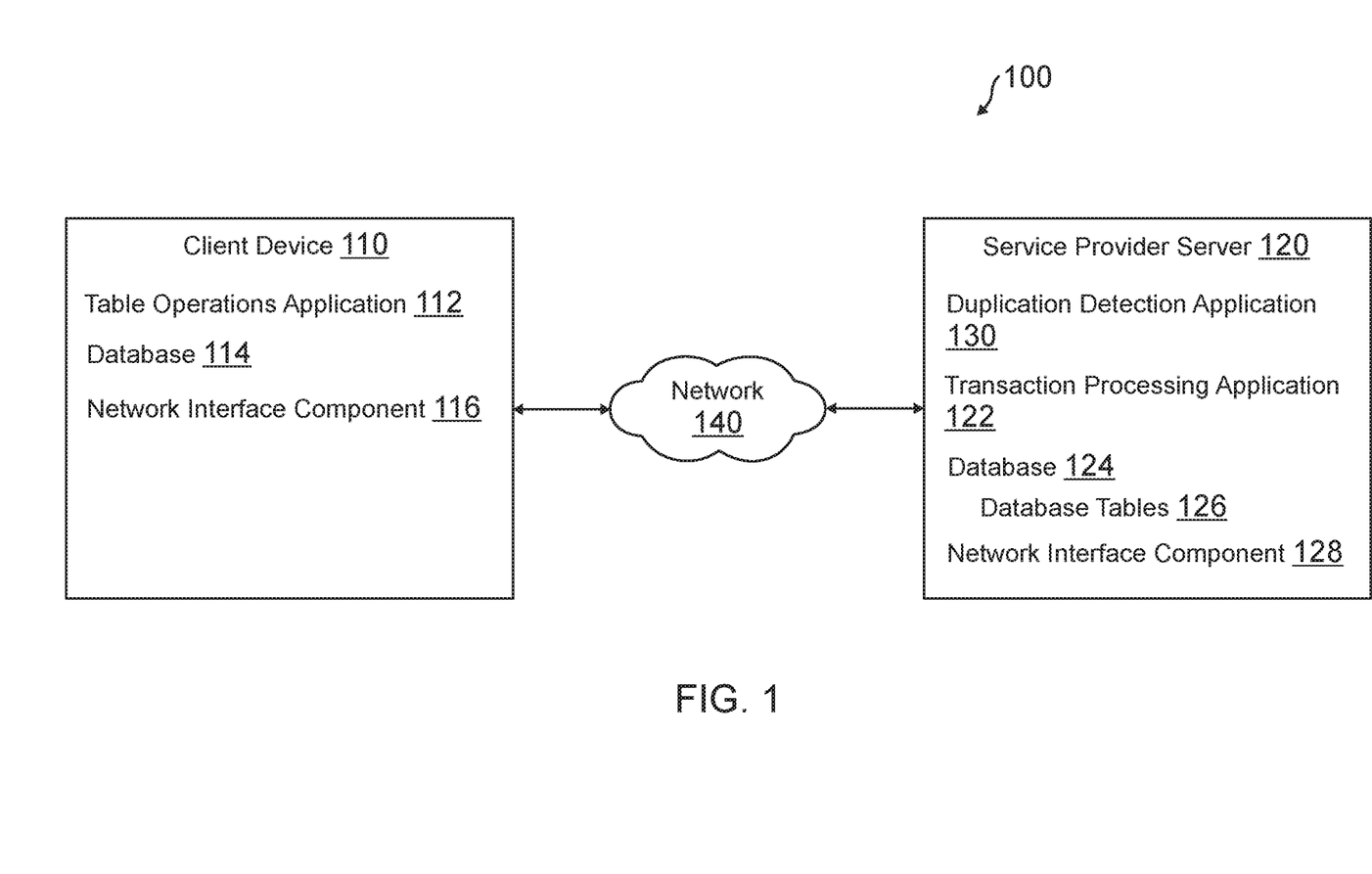
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity System 100 includes a client device 110 and a service provider server 120 in communication over a network 140. Client device 110 may be utilized by a user or administrator to access a computing service or resource provided by service provider server 120, where service provider server 120 may provide various data, operations, and other functions to client device 110 via network 140 including database storage operations. In this regard, client device 110 may be used to schedule and/or determine database duplication in databases managed by a DBMS of service provider server 120.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented as a communication device that may utilize appropriate hardware and software configured for wired and/or wireless communication with service provider server 120. For example, in one embodiment, client device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

Client device 110 of FIG. 1 contains a table operations application 112, a database 114, and a network interface component 116. Table operations application 112 may correspond to executable processes, procedures, and/or applications with associated hardware. In other embodiments, client device 110 may include additional or different modules having specialized hardware and/or software as required.

Table operations application 112 may correspond to one or more processes to execute software modules and associated components of client device 110 to provide features, services, and other operations for a user, administrator, developer, or other operator associated with service provider server 120 to detect data duplication within database tables of service provider server 120. In this regard, table operations application 112 may correspond to specialized software utilized by a user of client device 110 that may be used to access a website or UI provided by service provider server 120 to perform scheduling of data duplication detection operations, such as selection of a domain having a particular set of databases and/or database systems. The domain may correspond to a business unit, task, division, or department of an organization corresponding to service provider server 120, such as domains of an online transaction processor. Table operations application 112 may utilize one or more UIs, such as graphical user interfaces presented using an output display device of client device 110, to enable the user associated with client device 110 to enter and/or view data, navigate between different data, UIs, and executable processes, including scheduling the data duplication operations and viewing data duplication results for a domain and/or group of database tables. For example, table operations application 112 may be used to view graphs and other outputs of data duplication within a set or group of tables based on a relevance score, as well as the factors contributing to the relevance score (e.g., table uniqueness factors, duplication factors, usage factors, and/or size factors). Table operations application 112 may also be used to upload a new or test table and compare to others to receive a relevance score and/or factor associated with data duplication in those compared tables.

In some embodiments, the UIs may further allow the user to view database tables, update and/or change database tables and/or provide permissions by other users to access, use, and/or change database tables. For example, the database tables may be associated with customer account and/or transaction data for a transaction (e.g., a payment to another entity, such as a user, merchant, or other payee). The tables may include account information, user financial information, and/or transaction histories. However, in further embodiments, different services may be provided, including messaging, social networking, media posting or sharing, microblogging, data browsing and searching, online shopping, and other services available through online service providers. Each of these processes may encounter errors where assistance is provided in an intelligent and automated manner as discussed herein.

Client device 110 may further include database 114 stored on a transitory and/or non-transitory memory of client device 110, which may store various applications and data and be utilized during execution of various modules of client device 110. Database 114 may include, for example, identifiers such as operating system registry entries, cookies associated with table operations application 112 and/or other applications 114, identifiers associated with hardware of client device 110, or other appropriate identifiers, such as identifiers used for payment/user/device authentication or identification, which may be communicated as identifying the user/client device 110 to service provider server 120. Moreover, database 114 may include UI data for display of UIs and other data and operations for service provider server 120, as well as database tables and/or data duplication scheduling tables required for detecting data duplication in a database system's tables.

Client device 110 includes at least one network interface component 116 adapted to communicate with service provider server 120. In various embodiments, network interface component 116 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide operations for detection of data duplication within a domain or group of database tables. In this regard, service provider server 120 includes one or more processing applications which may be configured to interact with client device 110 to generate a UI and display the UI on client device 110 used to determine data duplication through a processing engine and operations of service provider server 120. In one example, service provider server 120 may be provided by PAYPAL®, Inc. of San Jose, Calif., USA. However, in other embodiments, service provider server 120 may be maintained by or include another type of service provider.

Service provider server 120 of FIG. 1 includes a duplication detection application 130, a transaction processing application 122, a database 124, and a network interface component 128. Duplication detection application 130 and transaction processing application 122 may correspond to executable processes, procedures, and/or applications with associated hardware. In other embodiments, service provider server 120 may include additional or different modules having specialized hardware and/or software as required.

Duplication detection application 130 may correspond to one or more processes to execute modules and associated specialized hardware of service provider server 120 to provide a platform and framework to provide data duplication detection services and processing to an organization, such as a business, service provider, or other entity that utilizes database systems. In this regard, duplication detection application 130 may correspond to specialized hardware and/or software used by service provider server 120 to allow for schedule and performing of data duplication detection with respect to one or more domains of the organization that is associated with database systems and storage. For example, duplication detection application 130 may provide an interface for the user associated with client device 110 to select a domain or multiple domains having associated databases storing database tables. This designation of a set of databases and/or database tables may allow duplication detection application 130 to execute one or more data collection daemons (e.g., applications and/or processes used to collect data, such as those that may operate in a background and/or continuously to collect data) that collect metadata for the designated tables from the database sources of the domains.

However, in other embodiments, duplication detection application 130 may continuously or periodically execute the data collection daemons from those sources so that metadata may be accessed immediately and/or updated for the database tables without user request. The metadata may include column name, size, length, number of columns in the table, or other column parameter that allows for comparison of columns between tables in a faster and more efficient manner than comparing each entry within a column. However, one or more individual entries within a column may also be used. Additionally, the metadata may include table size in database space (e.g., byte size), table usage or processing hit rates, and/or table creation date.

Once the metadata is accessed for a set or domain associated with the database tables, the metadata may be processed by duplication detection application 130 to generate and/or determine groups or clusters of tables. Each group or cluster of tables includes a master table used to generate the group with derived tables. The master table may be selected based on one or more factors from the metadata, including a maximum sum of similarities to other tables, a creation timestamp, and/or a maximum number of columns. Derived tables in the group may correspond to those tables having a similarity to the master table, such as represented by a similarity metric being over a certain number, score, or other threshold. For the group of tables, a duplication factor is determined by duplication detection application 130 based on a uniqueness factor of each table and the group as a whole. A usage factor may be determined based on a usage rate and/or processing hit rate for operations on the tables within the group, which may be weighted by individual users and batching processing operations. Duplication detection application 130 further determines a size factor based on a weighted size (in bytes or other database space) of the tables in the group.

Using the duplication factor, the usage factor, and/or the size factor, duplication detection application 130 determines a relevance score that scores the overall relevance and data duplication within the group of tables. A high relevance score may be associated with low overall data duplication and high relevancy of each table in the group. However, a low score may correspond to higher data duplication, where processes may be required to lower data duplication, delete tables and/or columns, or otherwise resolve data duplication for the domain and/or group. A high relevance score may correspond to a score over a particular threshold or number, while a low score may be defined as scores below the threshold or number or less than another score. Moreover, the relevance scores for all groups of tables within the domain may be used (e.g., averaged or otherwise weighted) to determine an overall weighted relevance score for the database tables of the domain, thereby determining an amount of data duplication within the entire databases of the domain. Data duplication application 130 may also provide processes to enable permissions and usages of master tables and derived tables, such as when a similar column name, table data, or table is created, accessed or used. Further, duplication detection application 130 may be used to link to or provide the master table when accessing one or more of the derived tables, find duplicate tables and remove or delete, or otherwise provide operations to resolve data duplication. This may also include providing results to client device 110 via a user interface and/or receiving an uploaded table and comparing to a group or domain for data duplication detection with the uploaded table.

Transaction processing application 122 may correspond to one or more processes to execute modules and associated specialized hardware of service provider server 120 to process a transaction, which may be used to generate data that is stored by one or more databases analyzed by duplication detection application 130. In this regard, transaction processing application 122 may correspond to specialized hardware and/or software used by a user associated with client device 110 to establish a payment account and/or digital wallet, which may be used to generate and provide user data for the user, as well as process transactions. In various embodiments, financial information may be stored to the account, such as account/card numbers and information. A digital token for the account/wallet may be used to send and process payments, for example, through an interface provided by service provider server 120. In some embodiments, the financial information may also be used to establish a payment account. The payment account may be accessed and/or used through a browser application and/or dedicated payment application executed by client device 110 and engage in transaction processing through transaction processing application 122. Transaction processing application 122 may process the payment and may provide a transaction history to client device 110 for transaction authorization, approval, or denial. Data generated and operated on by transaction processing application 122 may be stored to one or more database tables 126 within database 124.

Additionally, service provider server 120 includes database 124. Database 124 may store various identifiers associated with client device 110. Database 124 may also store account data, including payment instruments and authentication credentials, as well as transaction processing histories and data for processed transactions. Database 124 may store financial information and tokenization data, as well as transactions, transaction results, and other data generated and stored by transaction processing application 122. This may include data from one or more domains stored in the tables of database tables 126. Database 124 may further store data processed by duplication detection application 130, including results from data duplication detection operations.

In various embodiments, service provider server 120 includes at least one network interface component 128 adapted to communicate client device 110 over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
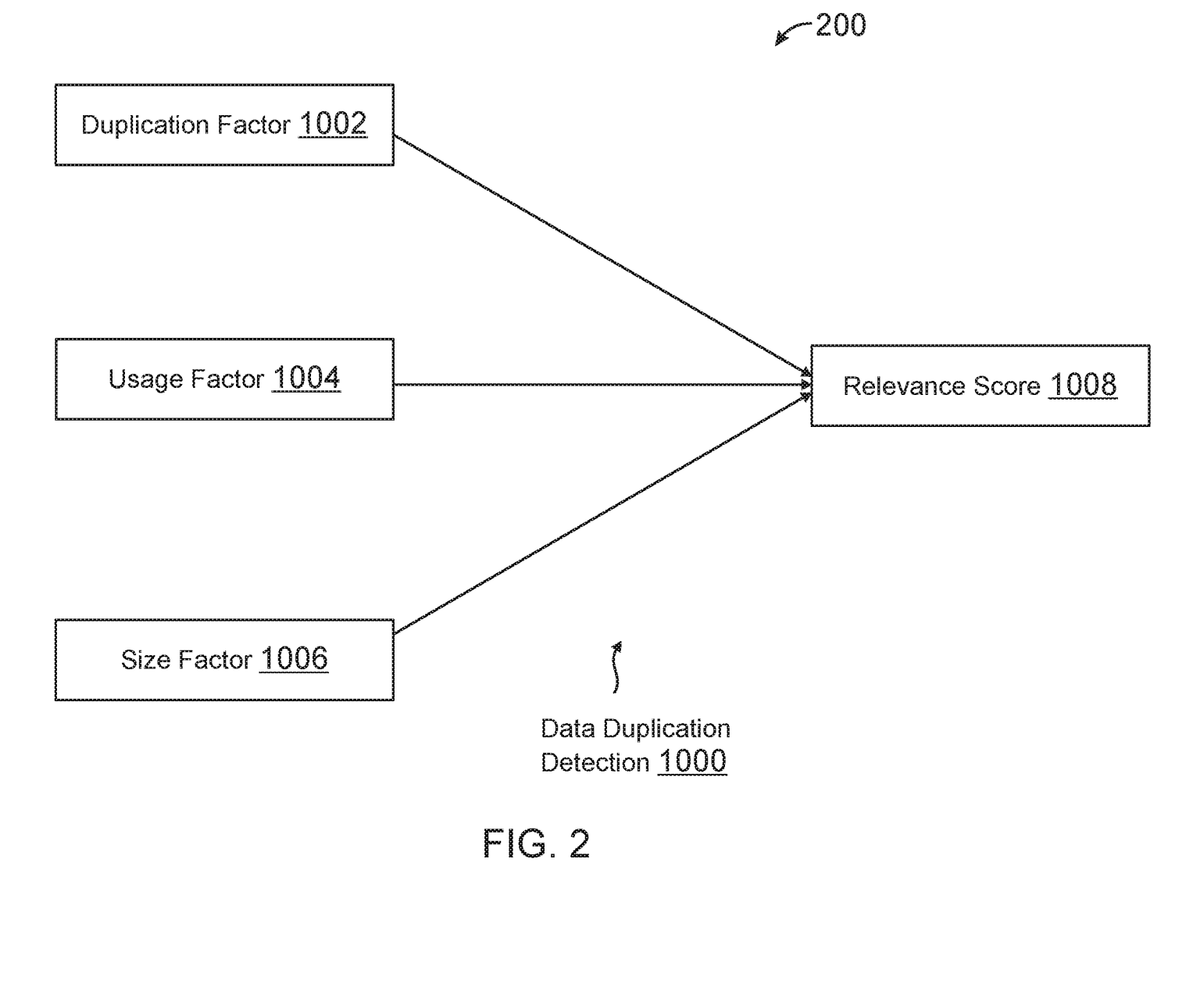
FIG. 2 is an exemplary block diagram for a relevance score determination for data duplication, according to an embodiment.

FIG. 2 is an exemplary block diagram 200 for a relevance score determination for data duplication, according to an embodiment. Diagram 200 of FIG. 2 includes factors that may be utilized in a relevance score determination by a data duplication detection engine of a service provider, such as service provider server 120 in system 100 of FIG. 1. In this regard, data duplication detection 1000 may include factors determined for a group of tables selected from a domain based on their similarities, which may be calculated using one or more similarity algorithms or techniques, such as Jaccard similarity.

For example, a selected domain having a database system that stores different database tables may encounter data duplication as other users and entities (e.g., automated and/or batch processor) generate, store, and operate on data within the database system. In order to detect and remove data duplication, data duplication detection 1000 may be performed on that domain. Prior to data duplication detection, an operation and/or application, such as a daemon, may collect metadata for the database tables of the domain. This may be done continuously or periodically over a period of time or when the domain is selected for analysis of data duplication. The metadata may include factors associated with table columns, table size (in number of columns and/or disk space), table creation data and/or age, or other parameters of the tables. Thereafter, data duplication detection may execute an operation to determine duplication factor 1002. Duplication factor 1002 may be determined by data duplication detection 1000 by first generating one or more groups or clusters of tables from the set of tables that is stored by the database system of the domain.

For example, to begin determining duplication factor 1002, data duplication detection 1000 may first determine a similarity of each table to each other table in the set of tables. The similarity may be based on matching column names, sizes, or attributes such that the matching columns from each table are compared. Matching columns may correspond to those columns having the same or similar data such that the columns are duplicated sufficiently between the tables. Data duplication detection 1000 may determine a similarity score, measure or factor based on one or more similarity algorithms or measurement techniques. For example, Jaccard similarity may correspond to the size of the intersection of features (e.g., column names) between the two tables divided by the size of the union of the features between the two tables (e.g., $J(X,Y)=|X \cap Y|/|X \cup Y|$). This may also be multiplied by 100 to give a percentage similarity score. Thus, with a set of ten tables, each table may have 9 similarities from the comparison to each other table (as well as a similarity of 1, under Jaccard similarity, or otherwise entirely similar to itself).

A master table may then be selected by determining a sum of each table's similarities and selecting a table having the highest similarity score, therefore, most similar to all other tables. In further embodiments, the master table may be selected based on a weighted score from factors including the highest sum of similarities, the table with the oldest creation date or timestamp, and/or the table with the maximum number of columns. Derived tables may then be selected by data duplication detection 1000 for the master table, where each derived table has a similarity to the master table over a threshold amount, score, or measure. For example, each derived table for a master table may be required to have a Jaccard similarity over 0.65 or 65%. However, other thresholds and measurements may be used. This process may repeat for second, third, fourth, and so on to generate multiple groupings of master tables and groups of derived tables for the tables of the domain. This may be done until no tables remain, or the remaining tables do not have a similarity to each other over the threshold amount required by data duplication detection 1000 (e.g., set by the user or admin when scheduling data duplication detection operations).

Once a group is determined, data duplication detection 1000 may determine the relevance score by generating and/or determining a duplication factor 1002 for the group based on the previously calculated similarities for the tables within the group. First, a uniqueness factor of each table in the group is determined by data duplication detection 1000, which may correspond to a calculation based on the similarity of that device table to the master table. The master table may be considered to be 1, 100%, or fully unique. The calculation for each derived table may be 1 (or 100% if using percentage Jaccard similarity) minus the derived tables similarity. For example, with a derived table having a Jaccard similarity of 0.70 or 70%, the uniqueness factor of the derived table to the master table would be 0.30 or 30%. Once all uniqueness factors are determined for all tables in the group, the uniqueness factors are averaged (including using the uniqueness factor of the master table) to determine a group uniqueness factor. Thereafter, data duplication detection 1000 performs a further calculation to determine duplication factor 1002, which may correspond to 1 (or 100%) minus the group uniqueness factor.

Data duplication detection 1000 may further determine usage factor 1004 for the tables within the group using the available metadata. When determining usage factor 1004 by data duplication detection 1000, the "hits" or processing operations and usages directed to each table are determined. This is determined for hits by individual users, such as developers, coders, administrators, or other end users that are directed to and/or affect the tables, as well as batch processing hits (e.g., jobs scheduled and executed without end user requests or interactions, such as those that are automated and run as resource permit). In order to determine usage factor 1004, data duplication detection 1000 may determine a group user usage (e.g., usage of the group of tables by end users) and a group batch usage (e.g., usage of the group of tables in batching processing operations).

Relative user usage for each table in a group may be determined as follows:

$$\text{Relative User Usage} = \frac{\text{User hits on a table in a group}}{\text{Max user hits on a table in the same group}}$$

For example, relative user usage may be determined as a ratio of the user hits on a single table per maximum user hits on any table in the same group.

Similarly, relative batch usage for each table in a group may be determined as follows in a similar ratio but instead using batch hits on the tables in the group:

$$\text{Relative Batch Usage} = \frac{\text{Batch hits on a table in a group}}{\text{Max batch hits on a table in the same group}}$$

Thereafter, a group user usage and a group batch usage may be determined and then weighed to generate usage factor 1004. Group user usage may be determined as follows:

$$\text{Group User Usage} = \frac{\sum \text{Relative User Usages for all tables in a group}}{\text{Total Number of tables in a group}}$$

Similarly, group batch usage may be determined as follows:

$$\text{Group Batch Usage} = \frac{\sum \text{Relative Batch Usages for all tables in a group}}{\text{Total Number of tables in a group}}$$

Thus, each group user/batch usage may be determined by summing the relative user/batch usages previously determined and dividing by the total number of tables in the group.

Finally, the group usage, or usage factor 1004, may be determined by data duplication detection 1000 as a weighted average of the group user usage and the group batch usage. Usage factor 1004 may be determined as follows:

$$\text{Group Usage Factor} = \frac{Wb * \text{Group Batch Usage} + Wu * \text{Group User Usage}}{Wb + Wu}$$

Where Wb is a weight applied to the group batch usage and Wu is a weight applied to the group user usage. In an exemplary system, Wb may be 1 and Wu may be 2 as applied by data duplication detection 1000, but other weights may be applied and adjusted by a user or administrator, such as to cause batch processing usage to be weighted higher to give increased weight to such batch processing hits.

Data duplication detection 1000 further determines size factor 1006 using disk space size, column size, or other database resource usage of each table in the group. Data duplication detection 1000 may utilize the metadata to determine size factor 1006 by determining a disk or storage size (e.g., in bytes, such as KB, MB, GB, etc.) of each table. A relative size of each derived table in the group may be determined and the relative size may be set at 1 or other maximum for the master table. To determine the relative size of a derived table, data duplication detection 1000 may operate as follows:

$$\text{Relative Size} = 1 - \frac{\text{Size of table in group}}{\text{Max size of a table in the group}} \text{ if derived table}$$

Thus, the relative size may take a ratio of the size of an individual derived table to the maximum size of a table in the group and subtract that ratio from one (or other maximum set size). Once the relative size of all tables in the group are determined (including the master table), size factor 1006 may be determined as follows for the group:

$$\text{Group Size Factor} = \frac{\sum \text{Relative Size of all tables in a group}}{\text{Total number of tables in a group}}$$

Thus, size factor 1006 may correspond to a sum of the relative size of all tables in the group divided by the total number of tables in the group.

Thereafter, data duplication detection 1000 may determine relevance score 1008 for the group of tables using duplication factor 1002, usage factor 1004, and size factor 1006. Relevance score 1008 may be determined as a weighted average of all of duplication factor 1002, usage factor 1004, and size factor 1006. For example, relevance score 1008 may be determined as follows:

$$\text{Relevance Score} = \frac{\text{Duplication Factor Size Factor} + \text{Usage Factor}}{3}$$

In some embodiments, relevance score 1008 may be weighted differently, for example, to give additional weight to a particular factor. For example, duplication factor 1000 may be more important for particular domains, admins, or other entities for data detection in a particular data set of tables. Thus, each factor may be multiplied by a weight, such as a percentage or numeric amount, to weigh each factor differently. Once relevance score 1008 is determined, an amount of data duplication in the group of tables may be viewed. Higher relevance scores may indicate little to no data duplication, while lower relevance scores may indicate higher amounts of data duplication within the group of tables. Relevance score 1008 may be determined for all groups of tables in a domain and averaged or otherwise weighted into a domain relevance score, which may then be used to view overall data duplication within the domain.

Figure 3:
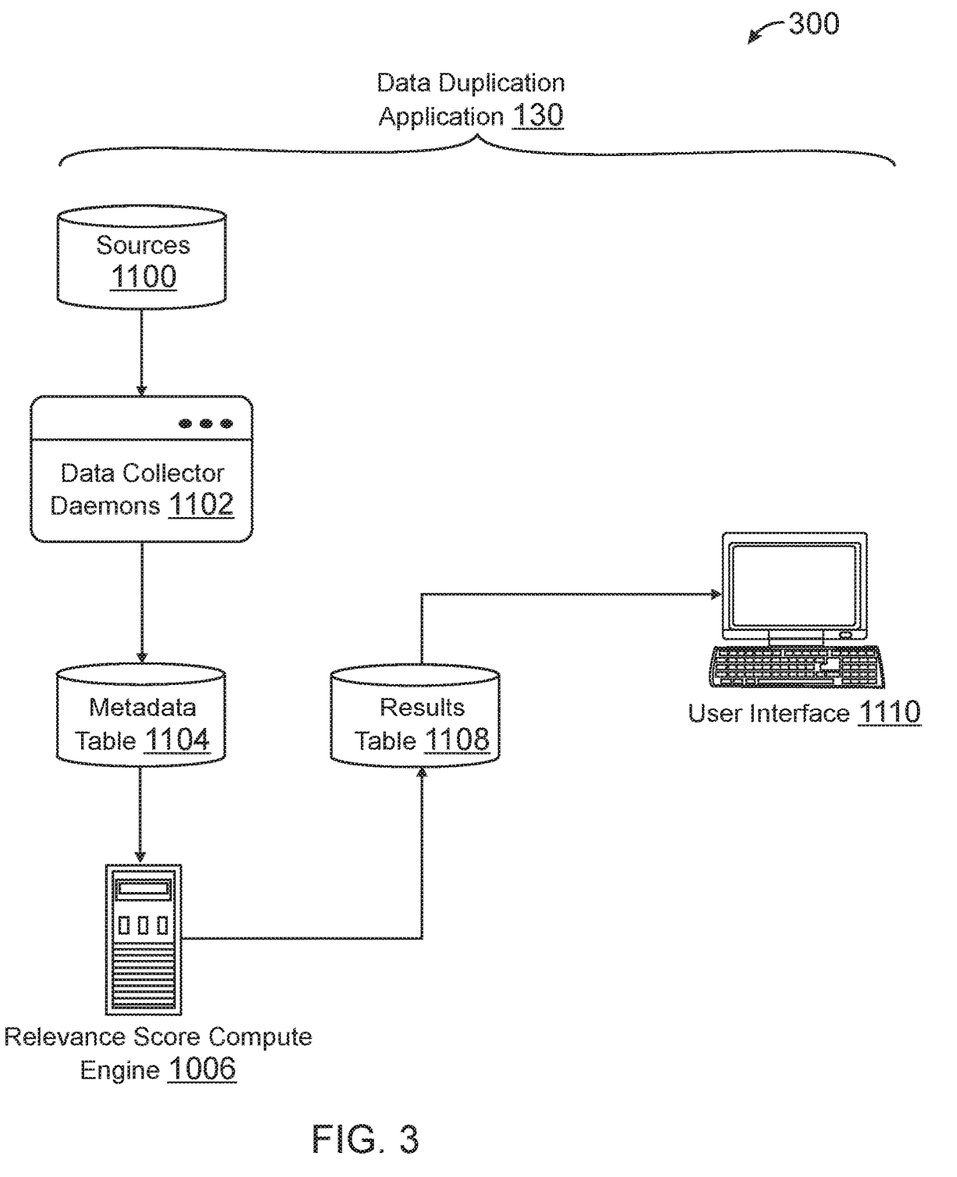
FIG. 3 is an exemplary environment where a data duplication system may determine relevance score to detect data duplication in tables within databases in a system, according to an embodiment.

FIG. 3 is an exemplary environment 300 where a data duplication system may determine relevance score to detect data duplication in tables within databases in a system, according to an embodiment. Environment 300 includes data duplication application 130 of service provider server 120 discussed in reference to system 100 of FIG. 1. In this regard, data duplication application 130 may operate within environment 300 to perform data duplication detection operations within database tables.

In environment 300, data duplication application 130 is associated with sources 1100 that may correspond to database table sources, such as databases of a domain and database system, which may be managed by a DBMS. Sources 1100 may therefore include data that may be duplicated between different tables of the database system and therefore data duplication within those tables may be required to be determined. Data duplication application 130 includes, operates, and/or is associated with data collector daemons 1102, which may correspond to a background process of a computer program or application that collects data on tables of sources 1100. Data collector daemons 1102 may serve to collect metadata for the tables within sources 1100, including metadata on columns within the tables (e.g., name, size, attributes, length, number, etc.), table disk space or size, table timestamps, and the like. Data collector daemons 1102 may correspond to a batch process that include instances that periodically and/or continuously collects the metadata from sources 1100. For example, one of data collector daemons may be assigned to a specific one of sources 1100, such as tables stored by Teradata, Oracle, or other database system for an organization and/or domain. After collecting the data, the data may be provided within a metadata table 1104 that may be operated on by data duplication application 130.

Thereafter, a relevance score compute engine 1106 of data duplication application 130 may access metadata table 1104, for example, in response to scheduling a job or operation for data duplication detection within sources 1100. Relevance score compute engine 1106 may correspond to the operations discussed in FIGS. 1 and 2 that may determine a relevance score for tables associated with a domain. Thus, relevance score compute engine 1106 may be used to first group tables according to master and derived tables, determine duplication factors, usage factors, and size factors for the grouped tables, and generate relevance scores for the tables within a domain. Relevance score compute engine 1106 may then store the results in a database as results table 1108. Results tables 1108 may include relevance scores for grouped tables, as well as graphs and other outputs that may be sued to visualize relevance and data duplication within tables of a domain. Thus, user interface 1110 provided by data duplication application 130 may be used to view results table 1108 and the various visualizations of data duplication within grouped tables of a domain and/or database system. Further, user interface 1110 may be used to schedule jobs and operations for determining data duplication by an end user, administrator, or the like. When viewing the results of data duplication, user interface 1100 may also be used to combine, delete, or otherwise resolve issues in data duplication within different tables. For example, user interface 1100 may be used to view duplicated columns and resolve column duplication in different tables, combine tables and/or columns, and/or provide permissions to other domains, end users, and the like to master and/or derived tables required to link and use those tables.

Figure 4:
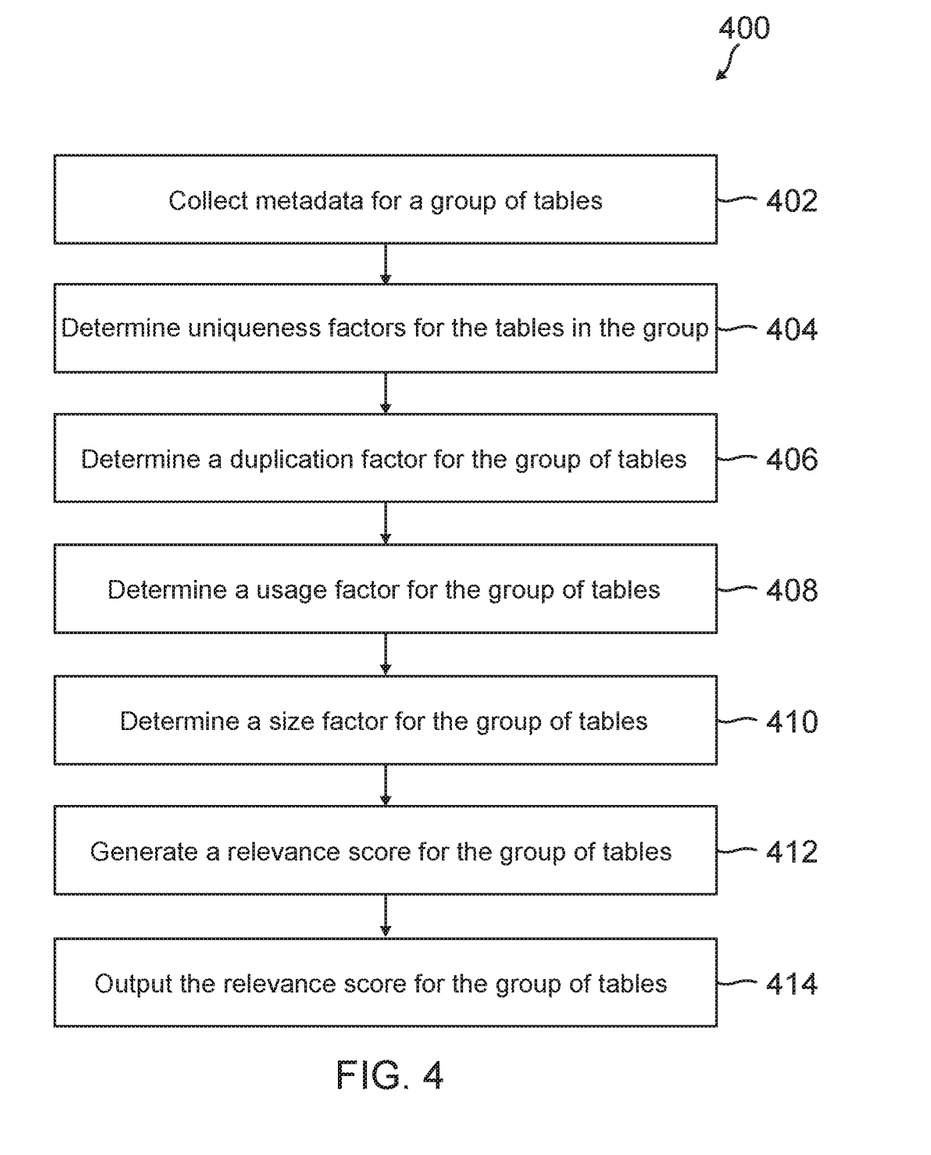
FIG. 4 is a flowchart for duplicate table identification in enterprise database systems for data storage optimization, according to an embodiment.

FIG. 4 is a flowchart 400 for duplicate table identification in enterprise database systems for data storage optimization, according to an embodiment. Note that one or more steps, processes, and methods described herein of flowchart 400 may be omitted, performed in a different sequence, or combined as desired or appropriate.

At step 402 of flowchart 400, metadata is collected for a group of tables. The metadata may be collected by a daemon of a data duplication program or operations of a service provider that determines data duplication in tables of database systems of the service provider. The metadata may include any data describing the tables, which may include data describing the columns of the tables, the size of the table, the timestamps of the table, and/or other metadata. Further, the metadata may be collected from one or more sources, which may correspond to internal or external database systems that store the data and tables of the service provider. Thereafter, the metadata is provided to the data duplication operations for determination of relevance scores indicating data duplication within the database tables.

At step 404, a unique score is determined for the tables. In order to determine the uniqueness score, the tables are first grouped based on a master table for the tables and derived tables that having a similarity to the master table over a certain threshold. This may be done by calculating the similarities of each table to other ones of the tables, as well as selecting a master table based on those similarities, table size or column number, and/or table timestamp. Uniqueness factors for the group of tables are determined by determining uniqueness factors of each table to the master and averaging those uniqueness scores. Once the group uniqueness factor is determined, a duplication score for the group of tables is determined, at step 406. The duplication factor may be determined by performing a calculation using the group uniqueness factor, such as by subtracting the group uniqueness factor from a number or amount (e.g., 1).

At step 408, a usage factor for the group of tables is determined. The usage factor may be determined based on usages of the tables in the group, which may be measured by the number of hits on the tables, such as operations accessing, affecting, or using the tables. Further the usage factor may correspond to a weighted average based on the usage of each table and from different sources of hits. These sources may include individual end users and batch processes. The data duplication operations may then determine a size factor for the group of tables, at step 410. The size factor may correspond to a weighted average of the size, in database storage space (e.g., disk space), column number or length, or other size measurement, of each table within the group. Thus, the size factor may correspond to an overall average of the size of each table.

Using the aforementioned duplication factor, usage factor, and size factor, at step 412, a relevance score is generated for the group of tables. The relevance score may correspond to a weighted average or other weighted score of the factors previously determined by the data duplication operations. The relevance score may correspond to a score or other visualization of the amount of data duplication within the tables for a group and/or domain. Once the relevance score is determined, the relevance score may be output for the group of tables, at step 414. The relevance score may be output through one or more user interfaces. Further, the data duplication operations may allow for end users to determine duplicate tables and remove based on the relevance score and/or grouped tables. The master table may be identified for highly duplicated tables in a group so that the master table may be linked to when derived tables are accessed and/or the same or similar columns or data are entered to new or different tables. The user interfaces may be used to upload other tables and compare those tables to those within a group and/or master table to determine data duplication within the tables for data duplication based on a relevance score.

Figure 5:
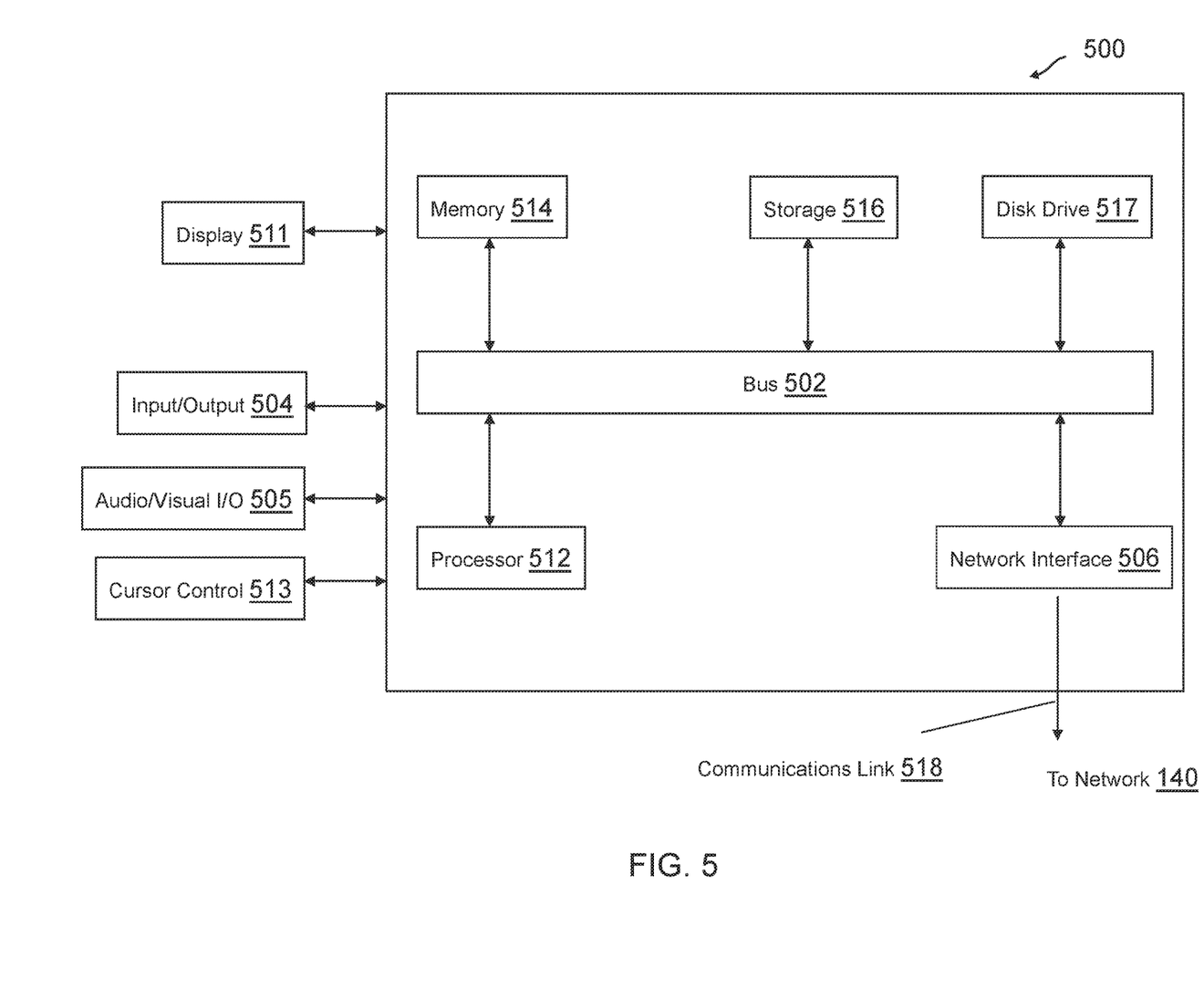
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
receiving a request to generate a relevance score for a first group of tables comprising a first master table and a plurality of first derived tables from a database system, wherein the first group of tables further comprises metadata for columns in the first master table and the plurality of first derived tables, and wherein the relevance score identifies data duplication within the database system;
determining a plurality of factors between each of the plurality of first derived tables and the first master table based on the metadata, wherein the plurality of factors are associated with matching columns between the first master table and the each of the plurality of first derived tables;
determining a duplication factor based on an average of the plurality of factors;
determining a usage factor for the first group of tables based on a group user usage and a group batch usage for the first group of tables; and
generating a relevance score based on the duplication factor, the usage factor, and a size factor associated with file sizes of the first group of tables.

2. The system of claim 1, wherein prior to the receiving the request to generate the relevance score, the operations further comprise:
receiving a plurality of tables, wherein the plurality of tables comprise the first master table and the plurality of first derived tables with at least one additional table;
determining similarity calculation values between each table of the plurality of tables;
summing the similarity calculation values for each table of the plurality of tables;
determining the first master table from the plurality of tables based on a highest one of the summed similarity calculation values; and
determining the first group of tables based on the first master table and the similarity calculation values for the plurality of first derived tables with the first master table exceeding a threshold value.

3. The system of claim 2, wherein the operations further comprise:
removing the first group of tables for the plurality of tables;
determining a second master table based on a highest one of the summed similarity calculation values from remaining ones of the plurality of tables after the removing; and
generating a second group of tables based on the second master table and the similarity calculation values for at least one second derived table with the second master table exceeding a threshold.

4. The system of claim 1, wherein the group user usage is associated with individual user hits on the first group of tables, and wherein the group batch usage is associated with batch hits on the first group of tables.

5. The system of claim 4, wherein the group user usage comprises relative user hits of the first group of tables compared to a number of the first group of tables, wherein the group batch usage comprises relative batch hits on the first group of tables compared to the number of the first group of tables, and wherein the usage factor comprises a weighted average of both the group user usage and the group batch usage.

6. The system of claim 4, wherein the group batch usage is weighed higher in the usage factor than the group user usage, wherein the individual user hits are associated with individual user systems interacting with the first group of tables, and wherein the batch hits are associated batch system processing interactions with the first group of tables.

7. The system of claim 1, wherein the operations further comprise:
executing a daemon computing application comprising a background process associated with database tables accessible to the system; and
collecting at least the first group of tables and the metadata from the database tables based on the executing the daemon computing application.

8. The system of claim 7, wherein the daemon computing application further comprises a schedule process for table duplication detection jobs associated with the database tables and a weight process to adjust weights associated with at least one of the duplication factor, the usage factor, the size factor, or the relevance score.

9. The system of claim 1, wherein the metadata is associated with at least the first group of tables and comprises at least one of data column names, data column lengths, column sizes, table usage rates, table hit rates, table sizes, or table creation timestamps.

10. The system of claim 1, wherein the operations further comprise:
detecting a usage of one of the plurality of first derived tables;
determining the first master table from the first group of tables; and
providing the first master table in response to the detecting the usage.

11. The system of claim 1, wherein the plurality of factors use column name similarities between the matching columns of the plurality of first derived tables and the first master table, wherein the duplication factor comprises a calculation based on an average associated with the column name similarities, and wherein the plurality of first derived tables are selected for the first group of tables based on the column name similarities exceeding a threshold similarity.

12. The system of claim 1, wherein the first master table is designated for the first group of tables based on at least one of a highest maximum sum of similarities to at least the plurality of first derived tables, an oldest creation timestamp of at least the first group of tables, or a maximum number of columns from the at least the first group of tables.

13. The system of claim 1, wherein the operations further comprise:
determining that the relevance score is below a threshold score; and
identifying the first group of tables as having a particular amount of table duplication based on the determining that the relevance score is below the threshold score.

14. A method comprising:
receiving of a plurality of tables;
determining metadata for the plurality of tables, wherein the metadata is associated with columns in the plurality of tables;
determining similarities between each one of the plurality of tables and other ones of the plurality of tables using the metadata, wherein the similarities are associated with matching ones of the columns in the plurality of tables;
determining sums of the similarities for the each one of the plurality of tables to the other ones of the plurality of tables;
selecting a master table from the plurality of tables based on a highest one of the sums;
determining data duplications within the plurality of tables based at least on the master table;
determining a usage factor of the master table and at least one derived table based on the data duplications; and
determining a cluster of tables for an identification of the data duplications within the cluster of tables based at least on the master table and the usage factor, wherein the cluster of tables comprises the master table and at least one derived table.

15. The method of claim 14, wherein the usage factor is further determined based on a first average from a number of individual user operations on the master table and the at least one derived table and a number of batching processing operations on the master table and the at least one derived table, and wherein the method further comprises
determining a duplication factor of the cluster of tables based on a second average of the similarities from each of the at least one derived table compared to the master table; and
determining a size factor of the cluster of tables based on a third average of table sizes of the master table and the at least one derived table.

16. The method of claim 15, further comprising:
determining a relevance score of the cluster of tables based on the duplication factor, the usage factor, and the size factor; and
providing the relevance score with the plurality of tables for the identification of the data duplications.

17. The method of claim 16, further comprising:
receiving, from a computing device, a request to access one of the at least one derived table; and
providing, to the computing device, information associated with at least one of the master table or the relevance score.

18. The method of claim 16, further comprising:
determining that column data associated with at least one of the master table and the at least one derived table was entered to a different table by a computing device; and
providing, to the computing device, information for the cluster of tables based at least on the relevance score.

19. The method of claim 14, wherein each of the at least one derived table have one of the similarities with the master table over a threshold score.

20. A non-transitory machine-readable medium having stored thereon machine-readable instructions executable to cause a machine to perform operations comprising:
determining a master table from a plurality of tables based on a highest sum of similarity scores between the master table and each of the plurality of tables;
determining a derived table based on a similarity score between the derived table and the master table exceeding a threshold;
generating a duplication factor for a group of tables comprising at least the master table and the derived table based at least on the similarity score;
generating a usage factor for the group based at least on a number of tables in the group, batch hits of the tables in the group, and user hits of the tables in the group;
generating a size factor for the group based at least on a file size of the master table and a file size of the derived table; and
determining a relevance score based on the duplication factor, the usage factor, and the size factor.

* * * * *